US011826708B2

United States Patent
Rahardianto et al.

(10) Patent No.: US 11,826,708 B2
(45) Date of Patent: Nov. 28, 2023

(54) METHOD AND APPARATUS FOR REAL-TIME DIRECT MEMBRANE MONITORING

(71) Applicant: Noria Water Technologies, Inc., Los Angeles, CA (US)

(72) Inventors: Anditya Rahardianto, Los Angeles, CA (US); Muhammad Bilal, Los Angeles, CA (US)

(73) Assignee: Noria Water Technologies, Inc., Los Angeles, CA (US)

( * ) Notice: Subject to any disclaimer, the term of this patent is extended or adjusted under 35 U.S.C. 154(b) by 275 days.

(21) Appl. No.: 17/217,818

(22) Filed: Mar. 30, 2021

(65) Prior Publication Data

US 2021/0213391 A1 Jul. 15, 2021

Related U.S. Application Data

(63) Continuation of application No. 16/640,713, filed as application No. PCT/US2018/028823 on Apr. 23, 2018, now Pat. No. 10,960,357.

(51) Int. Cl.
*B01D 65/10* (2006.01)
*B01D 65/08* (2006.01)
(Continued)

(52) U.S. Cl.
CPC .......... *B01D 65/10* (2013.01); *B01D 65/08* (2013.01); *G01N 15/0806* (2013.01);
(Continued)

(58) Field of Classification Search
CPC .......... B01D 65/08; B01D 65/10; B01L 3/50; G01N 15/0612; G01N 15/0806;
(Continued)

(56) References Cited

U.S. PATENT DOCUMENTS 3,975,084 A 8/1976 Block
4,151,086 A 4/1979 Robert et al.
(Continued)

FOREIGN PATENT DOCUMENTS

WO 2004031818 A2 4/2004
WO WO-2004031818 A2 * 4/2004 ............ G02B 6/0033
(Continued)

OTHER PUBLICATIONS

Uchymiak, et al., "A novel RO ex situ scale observation detector (EXSOD) for mineral scale characterization and early detection," J. of Membrane Sci., 291:86-95. (Year: 2007).*

(Continued)

*Primary Examiner* — Patrick Orme
(74) *Attorney, Agent, or Firm* — Nolan Heimann LLP; Adam Diament

(57) ABSTRACT

A membrane surface monitoring system (MSM) and membrane surface monitoring cell for direct and unambiguous detection of membrane surface fouling and mineral scaling. The system includes a membrane surface monitoring system cell, a control valve, a retentate flow meter/transmitter and a controller. The MSM cell has a visually-observable membrane, an edge-lit light guide, an edge illumination light source, a retentate module, and a permeate module. A pressurized inlet stream is fed into the MSM cell. The feed contacts a membrane sheet, leading to membrane-based separation operation to produce retentate and permeate streams. The MSM cell integrates surface illumination and imaging components to allow direct real-time visualization and spectral imaging of the membrane surface in real time. The pressure on the feed-side of the MSM cells is approximately that of the membrane plant element being monitored such that the plant control system can adjust plant operating conditions.

13 Claims, 12 Drawing Sheets

(51) Int. Cl.
  *H04N 23/74* (2023.01)
  *G01N 15/08* (2006.01)
(52) U.S. Cl.
  CPC ....... *H04N 23/74* (2023.01); *G01N 2015/084* (2013.01); *G01N 2015/0846* (2013.01)
(58) Field of Classification Search
  CPC ..... G01N 2015/084; G01N 2015/0846; G01N 2201/08; G02B 6/00; H04N 5/2354
  See application file for complete search history.

(56) References Cited

U.S. PATENT DOCUMENTS

| | | | |
|---|---|---|---|
| 4,374,891 | A | 2/1983 | Ward |
| 5,017,009 | A | 5/1991 | Schutt et al. |
| 5,982,534 | A | 11/1999 | Pinkel et al. |
| 6,017,459 | A | 1/2000 | Zeiher et al. |
| 6,306,291 | B1 | 10/2001 | Lueck |
| 6,463,790 | B1 | 10/2002 | Chun et al. |
| 6,704,140 | B1 | 3/2004 | Richardson |
| 6,838,002 | B2 | 1/2005 | Zeiher et al. |
| 7,910,004 | B2 | 3/2011 | Cohen et al. |
| 8,086,083 | B2 | 12/2011 | Mueller et al. |
| 2002/0134716 | A1 | 9/2002 | Maartens et al. |
| 2009/0045144 | A1* | 2/2009 | Cohen .................. B01D 61/025 210/745 |
| 2010/0176056 | A1 | 7/2010 | Rozenberg |

FOREIGN PATENT DOCUMENTS

| | | |
|---|---|---|
| WO | 2006130815 A2 | 12/2006 |
| WO | 2017046552 A1 | 3/2017 |
| WO | 2017109287 A1 | 6/2017 |

OTHER PUBLICATIONS

A. Subramani and E.M.V. Hoek, Direct observation of initial microbial deposition onto reverse osmosis and nanofiltration membranes, Journal of Membrane Science 319 (2008) 111-125.
A.R. Bartman et al., Mineral scale monitoring for reverse osmosis desalination via real-time membrane surface image analysis, Desalination xxx (2010) xxx-xxx; doi: 10.1016/j.desal.2010.10.021.
E.W. Tow and J.H. Leinhard, Unpacking compaction; Effect of hydraulic pressure on alginate fouling, Journal of Membrane Science 544 (2017) 221-233.
E.W. Tow et al., In situ visualization of organic fouling and cleaning mechanisms in reverse osmosis and forward osmosis, Desalination 299 (2016) 138-147.
H. Gu et al., Self-adaptive feed flow reversal operation of reverse osmosis desalination; Desalination xxx (2012) xxx-xxx; http://dx.doi.org/10.1016/j.desal.2012.07.041.
J. Benecke et al., Investigating the development and reproducibility of heterogeneous gypsum scaling on reverse osmosis membranes using real-time membrane surface imaging, Desalination 428 (2018) 161-171.
J. C. Chen, Q. Li, M. Elimelech, In situ monitoring techniques for concentration polarization and fouling phenomena in membrane filtration; Advances in Colloid and Interface Science 107 (2004) 83-108.
J. Phattaranawik et al., Novel membrane-based sensor for online membrane integrity monitoring, Journal of Membrane Science 323 (2008) 113-124.
J. Thompson, N. Lin, E. Lyster, R. Arbel, T. Knoell, J. Gilron, Y. Cohen, RO membrane mineral scaling in the presence of a biofilm; Journal of Membrane Science, 415-416 (2012) 181-191.
J.S. Vrouwenvelder et al., The Membrane Fouling Simulator as a new tool for biofouling control of spiral-wound membranes; Desalination 204 (2007) 170-174.
J.S. Vrouwenvelder et al., The Membrane Fouling Simulator: A practical tool for fouling prediction and control; Journal of Membrane Science 281 (2006) 316-324.
K. Cobry et al., Comprehensive experimental studies of early-stage membrane scaling during nanofiltration; Desalination; 283 (2011) 40-51.
L.N. Sim et al., A review of fouling indices and monitoring techniques for reverse osmosis, Desalination xxx (xxxx) xxx-xxx, https://doi.org/10.1016/j.desal.2017.12.009.
M. Uchymiak et al., Brackish water reverse osmosis (BWRO) operation in feed flow reversal mode using an ex situ scale observation detector (EXSOD), Journal of Membrane Science; 341 (2009) 60-66.
M. Uchymiak, A. Rahardianto, E. Lyster, J. Glater, Y. Cohen, A novel RO ex situ scale observation detector (EXSOD) for mineral scale characterization and early detection, J. Membr. Sci., 291 (2007) 86-95.
M.A. Saad, Early discovery of RO membrane fouling and real-time monitoring of plant performance for optimizing cost of water, Desalination 165 (2004) 183-191.
T. Nguyen et al., Biofouling of Water Treatment Membranes: A Review of the Underlying Causes, Monitoring Techniques and Control Measures, Membranes 2012, 2, 804-840.
X. Huang et al., A new high-pressure optical membrane module for direct observation of seawater RO membrane fouling and cleaning; Journal of Membrane Science 264 (2010) 149-156.
Y. Marselina, Characterisation of membrane fouling deposition and removal by direct observation technique; Journal of Membrane Science 341 (2009) 163-171.
Z. Hu et al., Real-time monitoring of scale formation in reverse osmosis using electrical impedance spectroscopy, Journal of Membrane Science 453 (2014) 320-327.

* cited by examiner

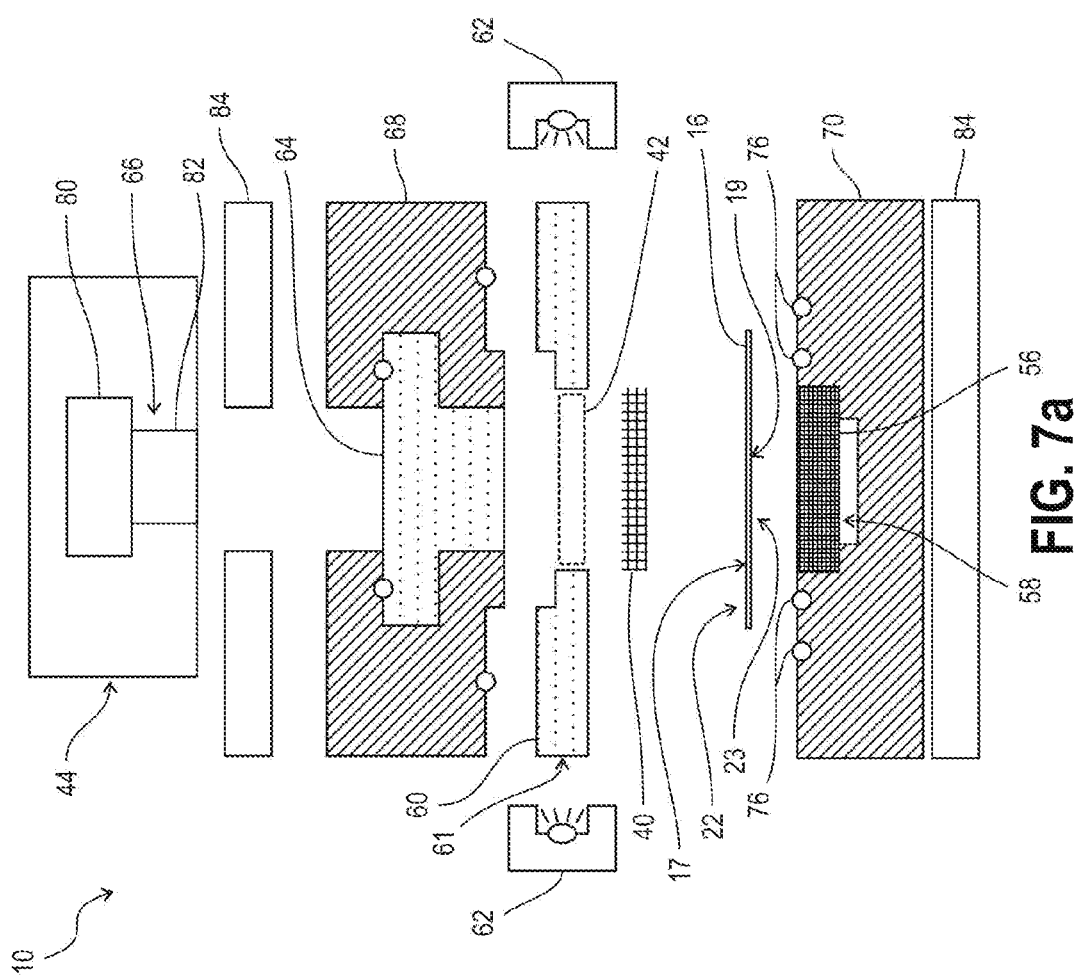

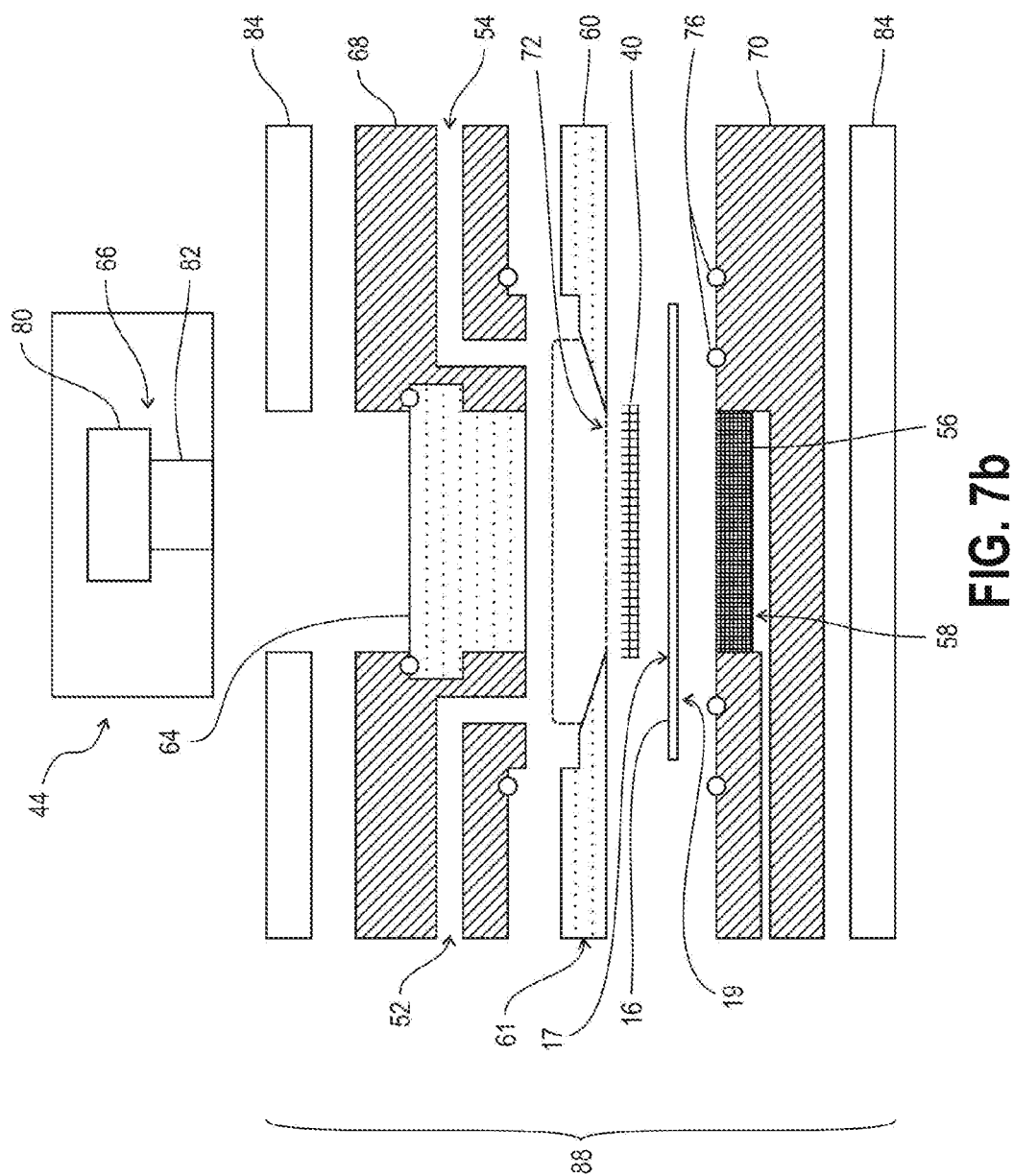

METHOD AND APPARATUS FOR REAL-TIME DIRECT MEMBRANE MONITORING

CROSS-REFERENCE TO RELATED APPLICATIONS

This application is a continuation of pending U.S. patent application Ser. No. 16/640,713, filed Feb. 20, 2020, which is a national phase application under 35 U.S.C. § 371 of International Application No. PCT/US18/28823, filed Apr. 23, 2018, each of which is incorporated by reference for all purposes, in their entireties.

FEDERALLY SPONSORED RESEARCH OR DEVELOPMENT

None.

FIELD OF THE DISCLOSURE

The present invention relates to a membrane surface monitoring (MSM) system, and more specifically to a MSM system for direct detection of membrane surface fouling and mineral scaling.

BACKGROUND OF THE INVENTION

Membrane technology is used for filtration of various liquids. This technology is particularly useful for water and wastewater treatment and water desalination as it is simple to operate, requires minimal chemical use, and produces consistent and reliable water quality.

Some methods of filtration include the use of reverse osmosis (RO) and nanofiltration (NF), which can desalinate water by using a membrane. However, the use of membranes is limited by membrane mineral scale formation on the membrane surface due to precipitation of sparingly water-soluble salts, as well as fouling by particulate, colloidal matter and biofoulants.

One problem in filtration systems and methods is that as product water recovery increases along the membrane modules, mineral concentrations of mineral salts increase near the membrane surface and in the bulk of the membrane channels' feed-side. The concentration increase can rise to levels that exceed the solubility limits of mineral salts that are present in the feed water, and consequently precipitate in the bulk and deposit onto the membrane surface, and/or crystallize directly onto the membrane surface.

Mineral surface scaling results in permeate flux decline, which can ultimately lead to membrane damage and thus decreasing membrane longevity and increasing water treatment costs. Membrane fouling due to particulate matter, organics and biofoulants (e.g., bacteria), also blocks the membrane surface, and thus reduce membrane performance. Membrane mineral scaling and fouling both lead to flux reduction (for a given applied pressure) or demand increased applied pressure (for a given permeate flux) and thus result in increased operational (e.g., energy and treatment chemical) and maintenance costs.

There have been various attempts to combat membrane fouling and scaling. For example, in the case of mineral scaling antiscalants are utilized to retard mineral salt nucleation and growth with additional additives to promote suspensions of mineral precipitate in the bulk solution. The above is commonly utilized to reduce mineral scaling associated, for example, with calcium sulfate dihydrate (i.e., gypsum), calcium carbonate, and silica, which are three of the common problematic mineral scalants that occur with the use of membrane-based water desalination means and methods. Antiscalants can be utilized to suppress mineral scaling provided that the mineral salt saturation levels at the membrane surface do not exceed the recommended levels. It is noted that product water recovery may be limited even with the use of antiscalants. Moreover, setting the precise antiscalant dose can be a challenge, particularly when there is variability in water feed quality and required water productivity. Likewise, membrane fouling is affected by raw water feed quality, and feed pretreatment used to condition the raw feed water prior to membrane based water treatment/desalination.

To effectively mitigate or prevent mineral scaling on NF/RO membranes, early scale detection is critical in order to trigger the appropriate corrective actions. Mitigation can include, but is not limited to, adjustments of feed flow rate and pressure, plant product water recovery, antiscalant dose, and membrane cleaning.

Various approaches have been proposed for real-time detection of mineral scaling and fouling of RO membranes. The majority of the proposed approaches relied on aggregate and indirect measures of membrane fouling, such as permeate flux decline (for constant transmembrane pressure operation) or trans-membrane pressure (TMP) increase (for constant permeate flux operation). These methods do not provide adequate early detection of scaling and fouling, and cannot be used to ascertain the type of scaling/fouling that occur. Other attempted systems and methods that provide indirect detection of mineral scaling and fouling have used ultrasonic time-domain reflectometry (UTDR) and electrical impedance spectroscopy (EIS). UTDR and EIS signals can be correlated with mass or thickness of the scalant layer. However, these systems and methods have not sufficiently addressed the needs of the industry due to lack of sensitivity of the above approaches for early detection because they typically require a high surface loading of scalants or foulant deposits before affirmative scale detection can be made. The above approaches also do not provide direct identification of the type of foulants or scalants on the membrane surface nor surface imaging of the membrane surface in either in an ex-situ membrane cell or directly of RO plant elements.

Methods to image membrane surfaces whereby the light source is directed perpendicular to the membrane surface have been proposed for membrane water treatment under low pressure (e.g., micro and ultrafiltration) and where a chemical dye is introduced that interacts with surface deposited bacteria to provide visible contrast or sufficient visibility of surface bacterial. The latter approaches, however, are not suitable for membrane surface imaging when the fluid stream is under high pressure. Moreover, such membrane surface imaging methods are impractical for real-time monitoring given the need for dye injection to provide optical contrast.

One attempt to quantify the formation of mineral salt crystals on an RO membrane is disclosed in U.S. Pat. No. 7,910,004 to Cohen and Uchymiak, entitled "Method and System for Monitoring Reverse Osmosis Membranes," hereby incorporated by reference in its entirety, for all purposes, discloses a reverse osmosis (RO) flow cell that receives a slip stream from the RO unit (plant). The cell utilizes a light source directed (from outside the membrane channel) perpendicular to the flow direction. The light is directed onto mirrors (about 45-degree angle) placed along the flow channel corners, which then reflect the incident light across the membrane surface.

This attempted solution has not fully addressed the needs of the industry, owing to its awkwardness and fragility. For example, one shortcoming of conventional systems using reflecting mirrors is the technical difficulty in producing 45-degree mirrors that are of the order of 1 mm and less in thickness. Therefore, the use of mirrors is impractical when creating channels that mimic those found in commercial spiral-wound RO/NF elements, since channel height in such elements is typically less than 1 mm. The flow control approach in conventional systems is one in which adjustable valves at the inlet and outlet of the membrane flow channel are utilized to control the feed flow rate (and thus the crossflow velocity) and the feed-side pressure. The conventional systems require simultaneous adjustment of both valves in order to achieve pressure and flow control. Another limitation in attempted solutions is the need for an optical window with multiple components needed to secure the optical window to the rest of the cell, and avoid leakage. Irrespective of the above, creating a cell of height less than 1 mm would be infeasible due to the use of cell-embedded mirrors in conventional systems. Still another deficiency of conventional systems is that membrane replacement requires dismantling of multiple components and repositioning of the light source after membrane replacement, and a retentate channel created by a rubber sheet that can age deform due to temperature changes over time and prolonged compression.

Due to at least the above described shortcomings in current membrane monitoring systems, cells, and methods, there remains a continuing need for improved membrane monitoring systems, cells, and methods.

BRIEF SUMMARY OF THE PRESENT INVENTION

Embodiments of the invention include a membrane surface monitoring system for direct and unambiguous detection of membrane surface fouling and mineral scaling under operating conditions that extend to the high pressures in desalination plants. The system can be used to monitor any membrane element in a membrane water treatment and desalination plants. The system provides real-time surface images and reflectance spectral data of the membrane surface using either visible, UV or IR light source. Surface images and spectral data can be analyzed in real-time to provide a range of quantitative metrics regarding the evolution of fouling/scale coverage on the membrane surface, in addition to identification of the class of foulants and scalants, and establishing differences in the fouling/scaling over the operation period over the operational period of the membrane plant. Quantitative output of digital or analog signals relating to the fouling/mineral metrics can then be utilized to guide the plant operator in establishing the appropriate strategies for mitigating membrane fouling/scaling.

For example, early detection of fouling/scaling can be used to send a signal to a plant control system (or warn plant operators) to trigger scale mitigation actions such as fresh water flush, membrane cleaning with suitable cleaning solutions, adjustment of plant operating pressure, feed flow rate with or without adjustment of product water recovery, osmotic backwash of the membrane elements, in addition to triggering plant operation in the mode of feed flow reversal. The membrane surface monitoring system is fully automated and can be operated as a plant monitor or in a self-standing mode for diagnostic tasks (e.g., membrane characterization and assessment of the efficacy of operating conditions, antiscalants and membrane cleaning chemicals. The present invention offers a superior approach for real-time membrane surface monitoring that generates quantitative metrics of the type and severity of mineral scaling/fouling for plant feedback control to enable informative membrane plant monitoring and robust control.

The present invention advantageously uses an edge-lit light guide and edge illuminated light source, instead of mirrors, to direct light parallel to the membrane, so that stray light from the light source is reduced in order to improve the quality of the image captured by the image capturing device. By using an edge-lit light guide and illuminated light source instead of mirrors, numerous advantageous are imparted, such as minimizing cell structural variation over time, and a more accurate visual and spectral data analysis of the membrane surface.

In one aspect of the invention there is a membrane surface monitoring cell for use in monitoring membrane scaling, particulate fouling and biofouling that receives a feed stream and discharges a concentrate stream. The membrane surface monitoring cell has a visually-observable membrane having a first surface on an active feed-side. The membrane surface monitoring cell also has an edge-lit light guide having an aperture forming a retentate channel operable to isolate pressurized fluid in the retentate channel, the visually-observable membrane positioned adjacent the edge-lit light guide and overlay the aperture. The edge-lit light guide is composed of a transparent or translucent material to illuminate the first surface of the visually-observable membrane, which allows an observer to view scaling, particulates, and biofouling on the first surface of the visually observable membrane. The membrane surface monitoring cell also has an edge illumination light source affixed to the edge-lit light guide, and the edge illumination light source is operable to illuminate the edge-lit light guide, thereby providing illumination substantially parallel to the visually-observable membrane. The membrane surface monitoring cell also includes a retentate module, which has a retentate module support block, an optical window within the retentate module block, the optical window for viewing the visually-observable membrane, an inlet conduit for a feed intake stream into the membrane surface monitoring cell, and an outlet conduit for outlet of a liquid concentrate stream. The membrane surface monitoring cell also includes a permeate module, which has a permeate module support block, a permeate collector to receive to receive permeate that has passed through the aperture of the edge-lit light guide and visually-observable membrane, and a permeate outlet conduit to channel permeate away from the permeate module. In its operable configuration, the edge-lit light guide is positioned between the retentate module and the permeate module.

In another aspect of the invention there is a membrane monitoring system for monitoring scaling, particulate fouling, and biofouling in a filtration unit. The unit includes the membrane surface monitoring cell described above and in the detailed description of the embodiments, and also includes an imaging system configured and located relative to the monitoring system so as to be operable to capture an image of the surface of the visually-observable membrane, and create an image data signal indicative of the captured image. The system also includes a data processing system operatively linked to the imaging system so as to receive the image data signal therefrom. The data processing system is operable to analyze the image data and reflectance spectral signal so as to provide an indication of an extent of at least one of scaling, particulate and colloidal fouling, organics and biofouling, on the visually-observable membrane. The system also includes a controller operable to control illumination, image capturing, image data management, image analysis, spectral data acquisition and external data communication, inlet flow rate, and pressure on the active-feed to be approximately that of a membrane plant element or a plant segment being monitored.

In yet another aspect of the invention, the invention includes a method for monitoring membrane scaling and fouling, the method includes steps of providing a membrane surface monitoring cell as described above and in the detailed description of the embodiments, passing an intake stream across the first surface of the visually-observable membrane and collecting imaging and spectral data from an illuminated portion of the first surface of the visually-observable membrane. The collected data indicate presence and degree of scaling and fouling on the first surface of the visually-observable membrane. The collected data conveys the collected image and spectral data to a data processing system. The collected data are interpreted with the data processing system to determine the extent and nature of scaling and fouling on the visually-observable membrane which correlates to the scaling and fouling of the membrane of the filtration unit.

BRIEF DESCRIPTION OF THE DRAWINGS

FIG. 4b is a cross-sectional view in the x-z plane of the membrane surface monitoring cell of FIG. 4a;

FIG. 4c is a cross-sectional view in the y-z plane of the membrane surface monitoring cell of FIG. 4a;

FIG. 7a is an exploded cross-sectional view along the y-z plane of the membrane surface monitoring cell.

FIG. 7b is an exploded cross-sectional view along the x-z plan of the membrane surface monitoring cell.

DETAILED DESCRIPTION OF EMBODIMENTS

Figure 1:
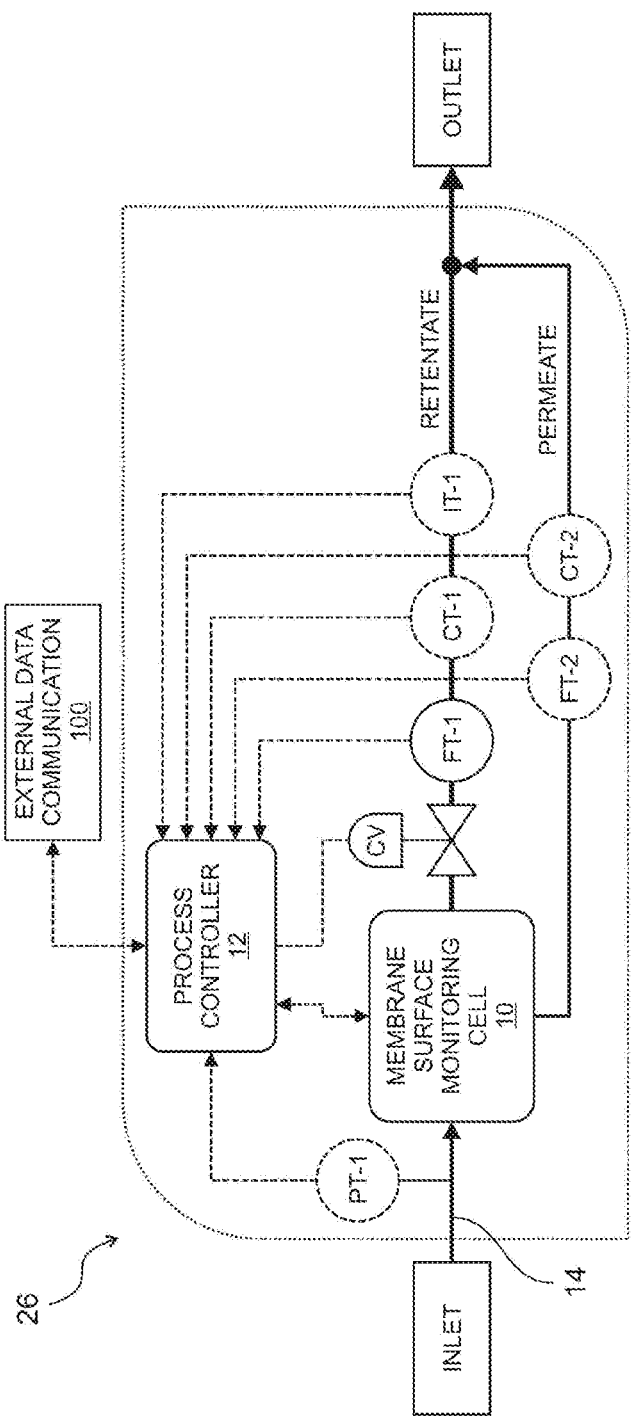
FIG. 1 is a diagrammatic view of a process schematic of a membrane surface monitoring system.

The invention now will be described more fully hereinafter with reference to the accompanying drawings, in which embodiments of the invention are shown. This invention may however be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section.

It will be understood that the elements, components, regions, layers and sections depicted in the figures are not necessarily drawn to scale.

The terminology used herein is for the purpose of describing particular embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," "left" or "right," "above" or "below," "front" or "rear," may be used herein to describe one element's relationship to another element as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. The invention illustratively disclosed herein suitably may be practiced in the absence of any elements that are not specifically disclosed herein.

Figure 6:
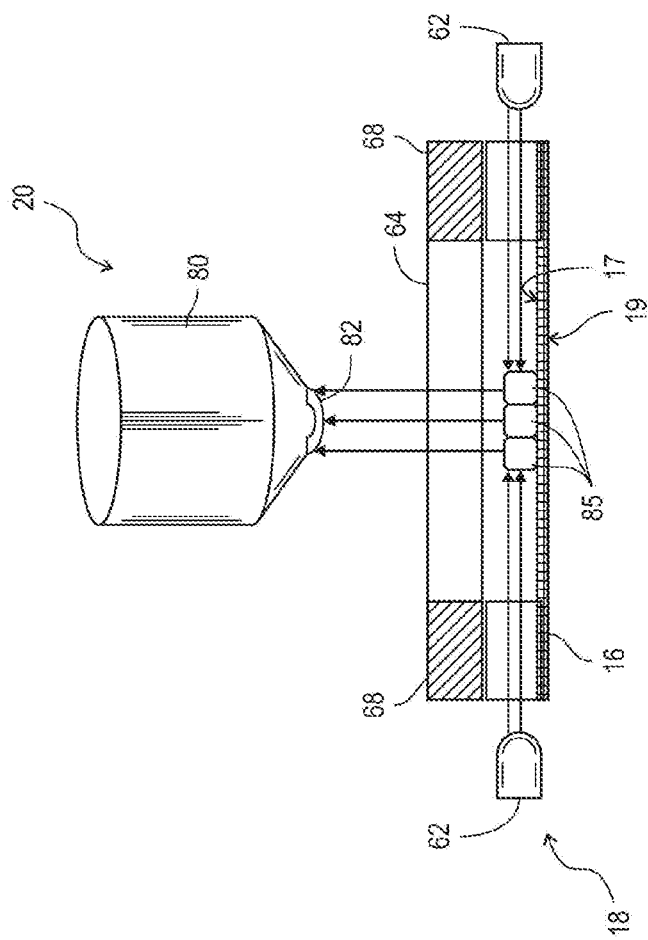
FIG. 6 is a semi-schematic view of a membrane surface monitoring cell showing the direction of light across the membrane of the cell.

Turning to the Figures, FIG. 1 represents a process schematic of a membrane surface monitoring (MSM) system that enables real-time direct monitoring of membrane surface during filtration (microfiltration, ultrafiltration, and nanofiltration) or reverse osmosis (RO). As depicted in FIG. 1, the MSM system is composed of an MSM cell 10, a control valve CV, a first retentate flow meter/transmitter FT-1, and a controller 12. A pressurized inlet stream 14 is fed to the MSM cell 10. In the cell MSM cell 10, the feed is contacted with a membrane sheet 16, leading to membrane-based separation operation (i.e., filtration such as ultrafiltration, nanofiltration or reverse osmosis) to produce retentate and permeate streams. The MSM cell 10 integrates surface illumination 18 and imaging components 20 (See FIGS. 4c and 6) to allow for direct real-time visualization of the membrane 16 surface in real time. A process controller 12 controls the imaging and illumination operations in the MSM cell 10, including illumination intensity control, image and spectral data capture triggering, image and spectral data management, image and spectral analyses, and external data communication 100. In order to regulate the inlet flow rate through the membrane surface monitoring cell 10 and maintain the pressure on a first surface of the membrane 17 (see FIGS. 4c, 6, and 7b) on the feed-side 22 of the MSM cell 10 to be approximately that of the membrane plant element or plant segment being monitored, a control valve CV is fitted at the retentate stream exiting the MSM cell 10. The process controller 12 provides feed-back control input to adjust the retentate flow rate and manipulates the control valve CV actuator based on the measured flow at a first retentate flow meter/transmitter FT-1, and set-point values of the retentate flow. Optional sensors can be fitted to the membrane surface monitoring system 6, including a first pressure sensor/transmitter PT-1 in the feed, a first conductivity meter/transmitter CT-1 in the retentate flow, a second conductivity meter/transmitter CT-2 along the permeate stream, a first temperature sensor/transmitter (TT-1) in the retentate stream, and a second flow meter/transmitter FT-2 in the permeate stream. These optional sensors/transmitters are useful for real-time characterization of the concentration polarization levels and membrane performance (i.e., water permeability, salt rejection) in the MSM cell 10.

Figure 2A:
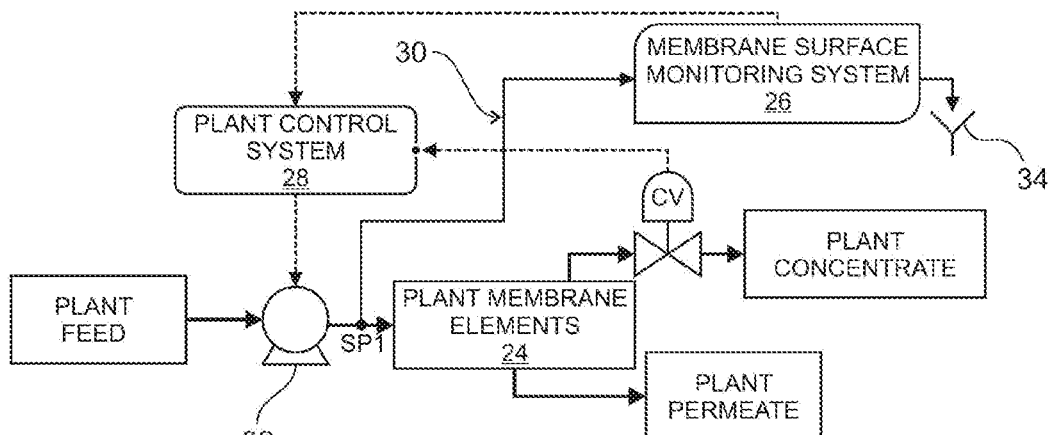
FIG. 2a is a diagrammatic view of an embodiment of a surface monitoring system deployment at membrane plant high-pressure feed.
Figure 2B:
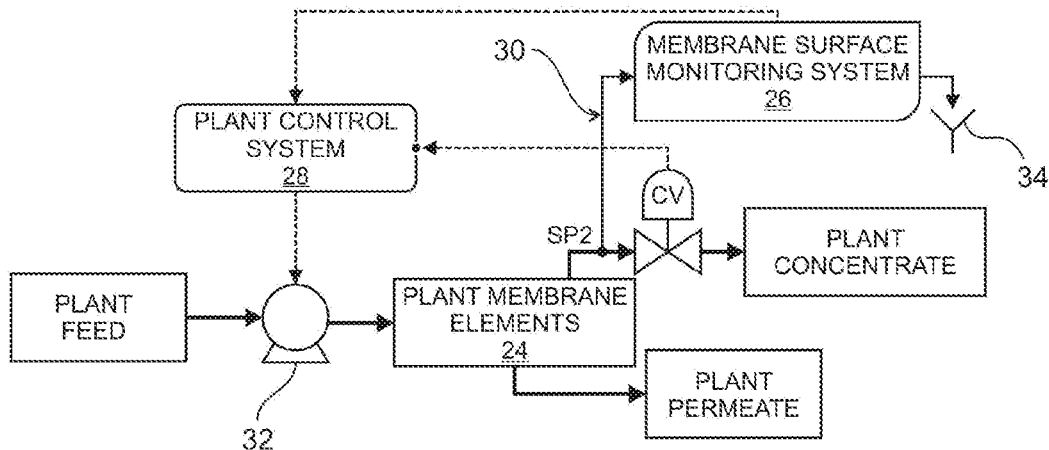
FIG. 2b is a diagrammatic view of an embodiment of a surface monitoring system deployment at membrane plant high-pressure concentrate.

The MSM system 26 can implemented in a variety of ways. FIG. 2a and FIG. 2b depict the most common implementations of the MSM system 26 for real-time monitoring membrane 16 fouling and/or scaling in a membrane plant having a membrane array of plant membrane elements 24. In each embodiment, the MSM system 10 is fed with a high-pressure side stream 30 (i.e., with sufficiently small flow rates to minimize impact on membrane plant operations) from the membrane plant filtration unit 24. For example, to monitor membrane fouling in the lead membrane elements of the membrane plant filtration unit 24, the MSM system 26 is fed with a small side stream 30 from the high-pressure membrane plant feed SP1 (See FIG. 2a). To monitor membrane fouling/mineral scaling in the tail membrane elements of the membrane plant 24, the MSM system 26 is fed with a small side stream 30 from the high-pressure membrane plant concentrate (i.e., from sampling point 2 SP2, see FIG. 2b). In both cases, the MSM system 26 informs the plant control system 28 on the state of the membrane plant 24 with respect to the onset and state of membrane 16 fouling/mineral scaling. This enables the plant control system 28 to appropriately adjust plant operating conditions (e.g., via the plant's pump 32 and valve settings, adjustment of the dose of treatment chemicals) so as to avert crippling effects of prolonged or uncontrolled membrane 16 fouling/mineral scaling conditions.

Figure 2C:
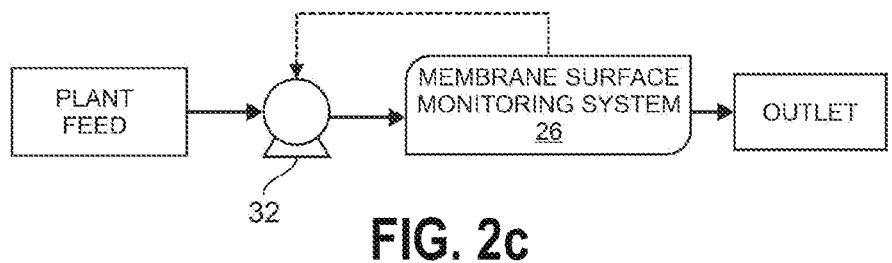
FIG. 2c is a diagrammatic view of an embodiment of a surface monitoring system deployment under stand-alone operation.

In addition to interfacing with the membrane plant 24 as embodied in FIGS. 2a and 2b, the MSM system 26 can also be configured as a stand-alone system operating with an external feed pump 32, as shown in FIG. 2c. The configuration shown in FIG. 2c can be utilized, for example, to evaluate the fouling or mineral scaling tendency of a given source water, assess the efficacy of fouling/mineral scaling mitigation methods (i.e., use antiscalant, feed pH adjustment, etc.), assess the effectiveness of feed pretreatment, and evaluate the water recovery limit of membrane operation (i.e., to avert fouling/mineral scaling).

An important aspect of the present invention is the approach of matching the pressure of the MSM cell 10 to be as close as possible with that of the membrane plant section 24 (e.g., lead or tail membrane elements, as in FIGS. 2a-b, either at the front end of the membrane plan near sampling point 1 as in FIG. 2a, or near sampling point 2 as in FIG. 2b) being monitored, while minimizing the impact on membrane plant operation. By matching the pressure, concentration polarization levels in the MSM cell 10 relative to the plant's membrane 24 elements being monitored can be regulated via by the retentate flow rate in the MSM cell 10. In the special case in which the flow channel geometry (i.e., channel thickness and channel spacer design) in the MSM cell 10 is the same as that of membrane element 24 in the plant, one can match the average retentate cross-flow velocity in the MSM cell 10 with that of the plant's membrane elements 24 being monitored in order to closely mimic the hydrodynamic conditions in the plant section being monitored.

Figure 3:
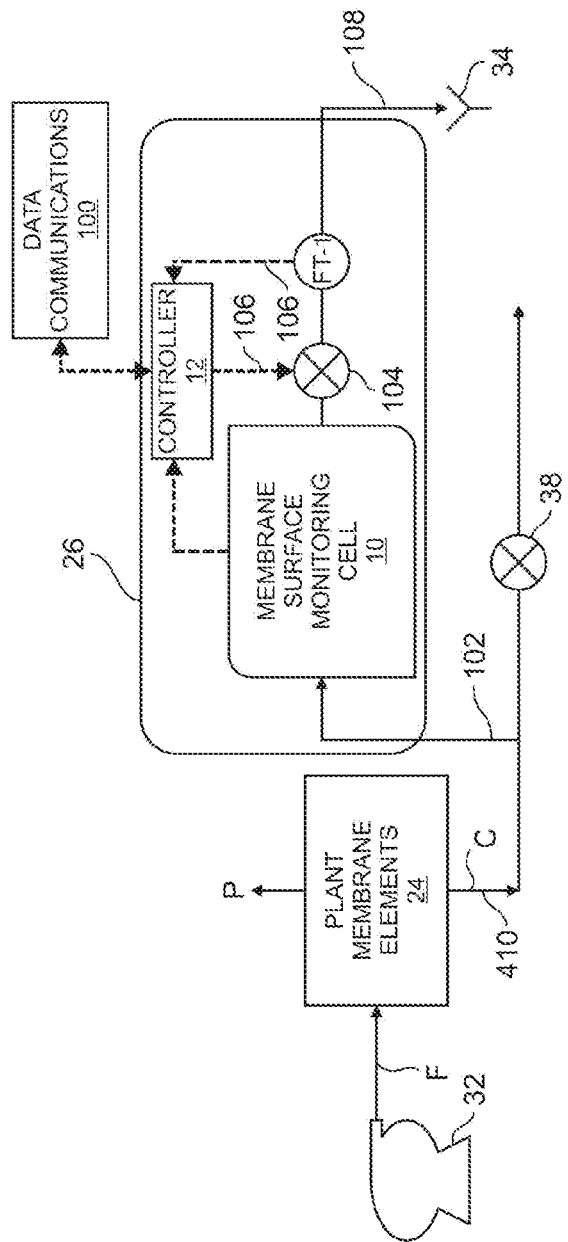
FIG. 3 is an embodiment of a membrane surface monitoring system integrated into a reverse osmosis stream.

As an illustration, consider the MSM system 26 implementation for monitoring a reverse osmosis (RO) plant's tail membrane elements 24 as depicted in FIG. 3 (i.e., same as the configuration in FIG. 2b). To minimize pressure drop through the MSM system 26, a flow restrictor (i.e., flow control valve) is not utilized in the side-stream conduit 102 feeding the MSM cell 10. However, the MSM system 26 retentate stream is fitted with a retentate stream flow control valve 104 in order to maintain the desired pressure and regulate the flow rate into the MSM cell 10. A first flow meter/transmitter is also connected to the outlet stream 108, and is operative connected via signal lines 106 to the controller 12. It is also imperative that the flow rate through the side stream conduit 102 is significantly smaller than the overall flow rate in the membrane plant concentrate (or retentate) conduit 36 such that the membrane plant main valve 38 can operate with minimal disturbance from the MSM system 26. The outlet flow from the MSM 26 is not returned to the concentrate stream C, but is disposed into a drain 34 or directed to the appropriate location in the plant as desired. In contrast, many current systems require a valve in the side stream conduit at the inlet to the monitoring system, which is used in conjunction with the membrane RO plant main valve and the monitoring system retentate valve to regulate the concentration polarization level in the monitoring cell. Because a side-stream conduit valve is utilized, this may lead to partial depressurization, requiring adjustment of retentate flow in the monitoring cell so as to maintain the desired concentration polarization level. The current invention is advantageous because of the benefits of matching the pressure of the monitoring cell 10 with that of the plant 24. In addition, the present invention is also advantageous because it can utilize a low flow in the side-stream conduit 102 to minimize the impact on the plant 24 operation. It is noted, without a loss of generality, that the present invention is applicable to monitoring of not only RO plants but also nanofiltration (NF), ultrafiltration, and microfiltration plants.

Membrane Surface Monitoring (MSM) Cell

Figure 4A:
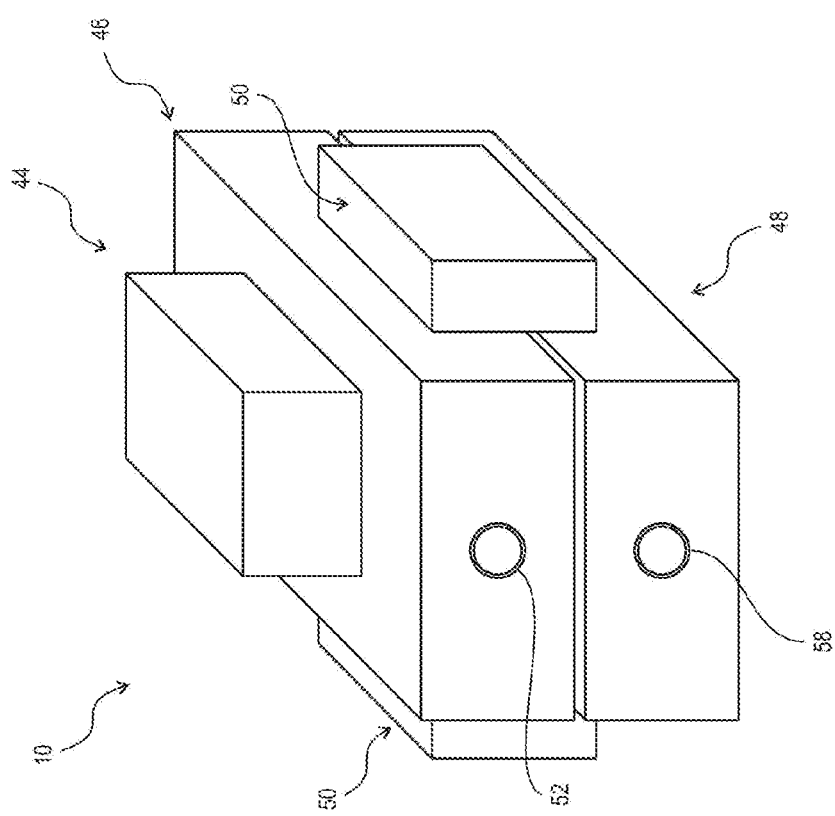
FIG. 4a is a perspective view of a membrane surface monitoring cell.
Figure 4B:
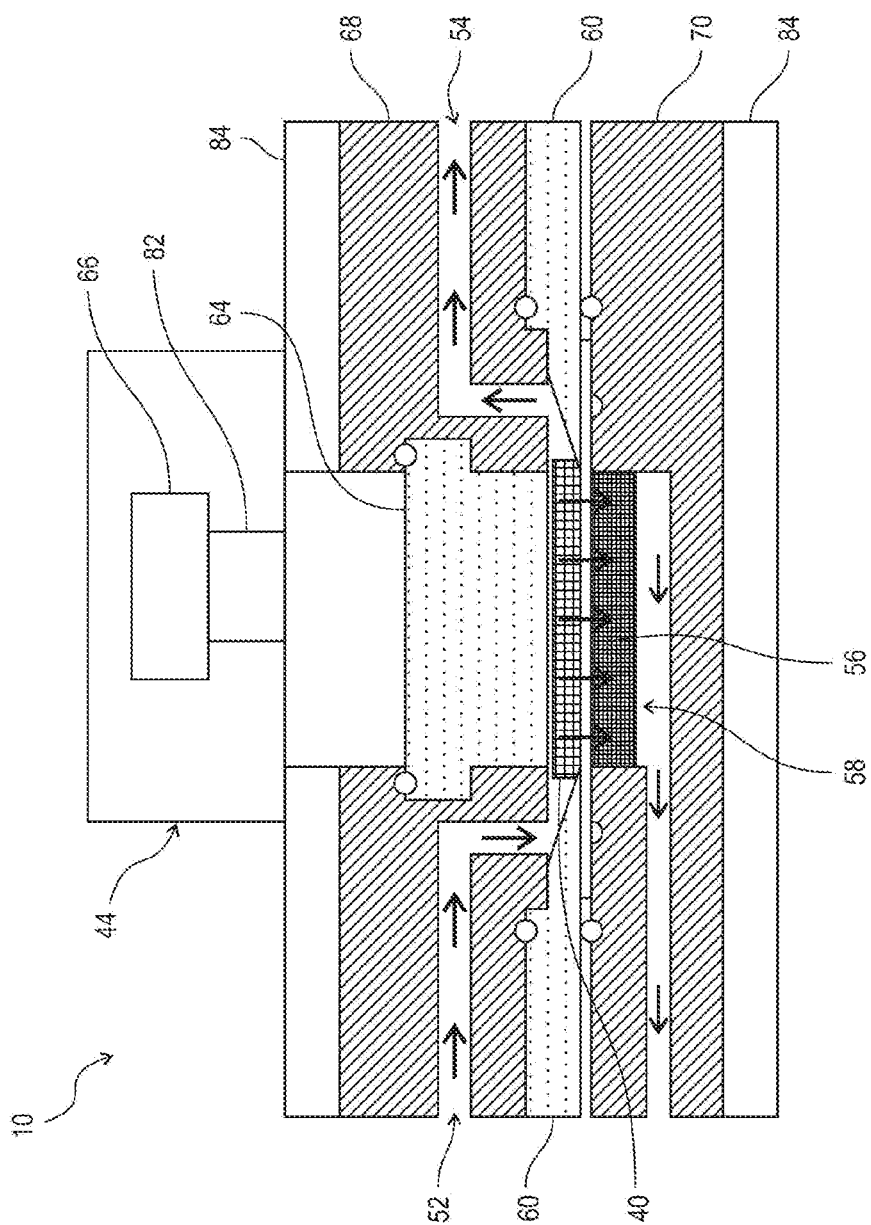
Figure 4C:
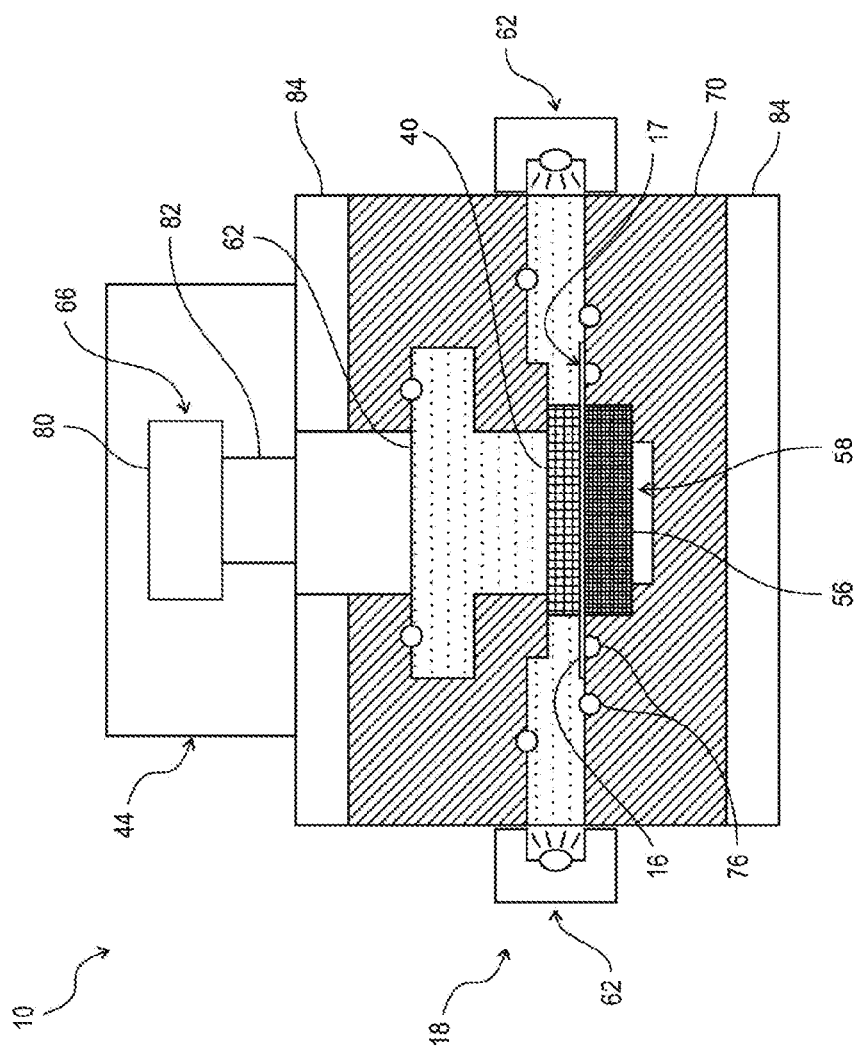

A central component of the present invention is the Membrane Surface Monitoring (MSM) cell 10, which contains several advantageous features not present in current membrane surface monitoring systems. The features in the present embodiments include the ability to utilize feed channel spacers 40 in the retentate channel 42 to closely mimic retentate channel geometry and flow conditions in typical spiral-wound membrane elements in a plant membrane system 24. In the present invention, the MSM cell 10 combines four major modules as a fully integrated system (FIGS. 4*a-c*): a) surface vision module 44, b) retentate module 46, c) a permeate module 48, and d) an edge illumination/light source 50. As shown in FIG. 4*a*, feed fluid enters the inlet conduit 5 in the retentate module 46. The fluid is directed to the retentate channel 42 in the retentate module 46, and contacted with a membrane 16 in the permeate module 48. Fluid that is rejected by the membrane 16 exits the retentate module 46 via the retentate outlet conduit 54. Fluid passes through the membrane 16 from the first surface 17 on the active side 22 to the second surface 19 of the membrane on the retentate side 23 of the cell. The fluid is collected in the permeate collection section 56 of the permeate module 48 and exits the cell 10 via the permeate outlet conduit 58. In the retentate module 46, a unique transparent edge-lit light guide 60 serves to both form the retentate channel structure 60 and enable side illumination parallel to the membrane 16 surface using an edge illumination/light source 50 affixed to a lateral edge 61 of the edge lit light guide 60. Because the retentate channel structure 60 can be made to be of essentially any thickness, it can be customized to match the thickness of feed spacers 40 commonly utilized in spiral-wound membrane elements. Typical feed spacers may be in the range of approximately 20-100 mils (about 0.5 mm to 2.5 mm), and preferably between approximately 20-40 mils (about 0.5 mm to 1 mm). As such, the use of a separate retentate channel structure 60 provides flexibility to use (or not use, i.e., empty channel) a feed spacer 40 in the retentate channel. The feed spacer is sized to accommodate a predetermined size of the retentate channel. A transparent section or optical window 64 in the retentate module 46 allows for direct visualization through the retentate channel 42 up to the membrane 16 surface via a camera-lens unit 64 in the surface vision module 44 having both a camera 80 and lens 82. The camera can be types of cameras ordinarily used for image capturing, and in a preferred embodiment is a CCD (charge-couple device), but may use other technology such as, but not limited to CMOS (complementary metal-oxide-semiconductor). In principle, any light source 62 of sufficient intensity can be utilized for edge illumination, ranging from visible-light LED to LEDs of various wavelengths (e.g., ultraviolet, infrared). Any camera-lens unit 66 can be utilized, ranging from macro-imaging, high magnification optical microscopy, to spectroscopic imaging (e.g., ultraviolet, visible, infrared). Various light sources and camera-lens units that can be used in the present invention are well known and understood by those having ordinary skill in the art.

Surface Illumination

Figure 5:
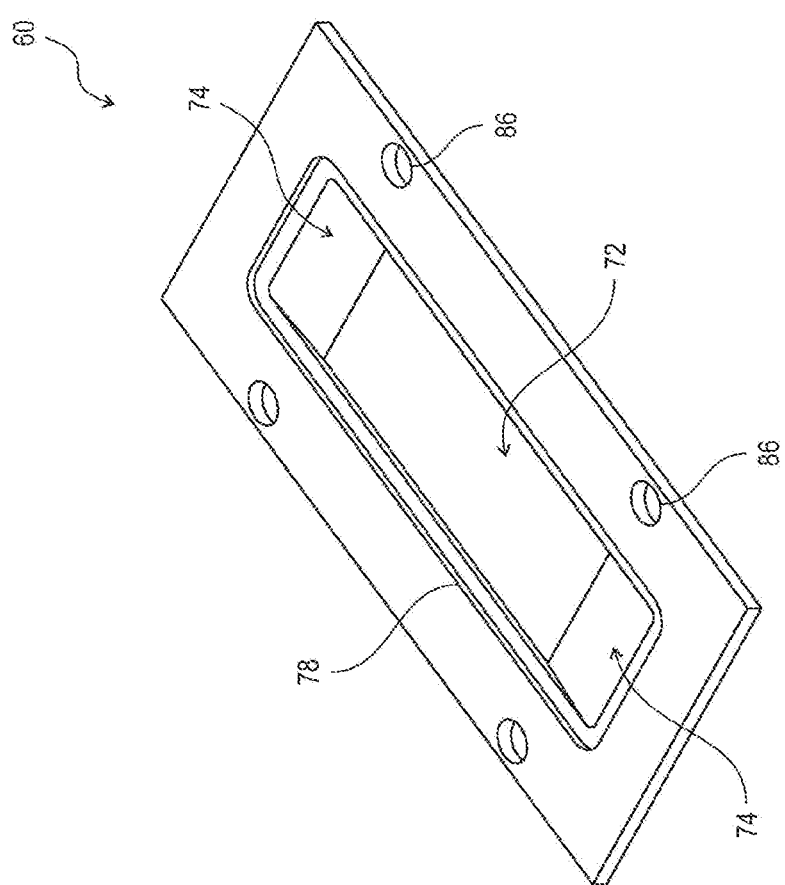
FIG. 5 is an embodiment of an edge-lit light guide.

The main principle for enhanced surface imaging in the present invention relies on specialized illumination that directs a light path to be just above the membrane 16 surface but at or nearly (i.e., low angle) parallel orientation. Using this approach, any object 85 forming on membrane 16 surface protrudes into the light path, leading to light scattering toward the camera (viewing through an optically transparent section 64 above the retentate channel 42) such that a high contrast (between the objects 85 and the membrane 16 surface background) image can be captured. This illumination technique is commonly known as low-angle or dark-field illumination, which is typically utilized to enhance the contrast between an object and the background surface. In applying this illumination technique for real-time membrane surface monitoring during filtration or reverse osmosis operation, the major technical challenge is how to provide parallel/low-angle illumination above a membrane 16 surface operating under pressurized, filtration or reverse osmosis conditions. In the present invention, the solution to this challenge is to utilize a transparent edge-lit light guide 60, shown in isolation in FIG. 5 and clamped down between a retentate support block 68 and a permeate module support block 70, which are preferably opaque. An opening or aperture 72 at the middle of the light guide 60 forms the retentate channel 42, which can be formed with customized channel thickness so as to accommodate common feed spacers 40 that are typically utilized in spiral wound membrane elements. Flow disturbance at the inlet/outlet regions of the retentate channel can be minimized by constructing gradients or tapered surfaces 74 at the light guide 60 surrounding the aperture 72. The tapered surfaces 74 surrounding the aperture 72 can be constructed using a range of angles to enable smooth flow entrance into the membrane channel 42. The functions of the transparent edge-lit light guide 60 include: a) forming the retentate channel structure to isolate the pressurized fluid in the retentate channel 42 and, with a plurality of sealing members 76, prevent leakage (positioned between at least two of the optical window and the retentate module, the retentate module support block and the edge-lit light guide, and the edge-lit light guide and the permeate module support block), b) clampdown of the membrane so it is affixed above the permeate collector 56, c) holding the opaque retentate module support block 68 that also acts as a frame for the transparent viewing section 64, d) accommodating an optional feed 40 spacer that can be placed inside the retentate channel 42 to closely mimic the hydrodynamic conditions in typical spiral-wound membrane element retentate channels 24, and e) enabling effective transmission of light using direct (i.e., without mirror reflection) edge illumination/light source 62 to illuminate the retentate flow channel 42, which can be empty or filled with feed spacers 40. The light guide 60, in combination with opaque support structure 68, ensures that light paths are at or near parallel orientation with respect to the membrane 16 surface, thereby minimizing stray light and maximizing contrast between objects on the membrane 16 surface and the background membrane 16 surface. Minimizing light paths that are perpendicular to the membrane 16 surface (i.e., stray light) in areas that are not covered by surface objects (i.e., clean area of the membrane) is critical to ensure enhanced imaging and good contrast between surface objects (especially transparent object) and the membrane 16 surface. It is also important to have even illumination with minimal post-assembly setup. It is noted that although the light guide can be made of any transparent material, plastic edge-lit light guide 60 made from acrylic formulated with dispersed light-diffusing particles (such as Lucitelux LGP or Acrylite Endlighten) is preferable, for many membrane surface monitoring applications, as it best provides even illumination throughout the entire retentate flow channel 42 with minimal adjustment of the edge illumination/light source 62 orientation.

Figure 9:
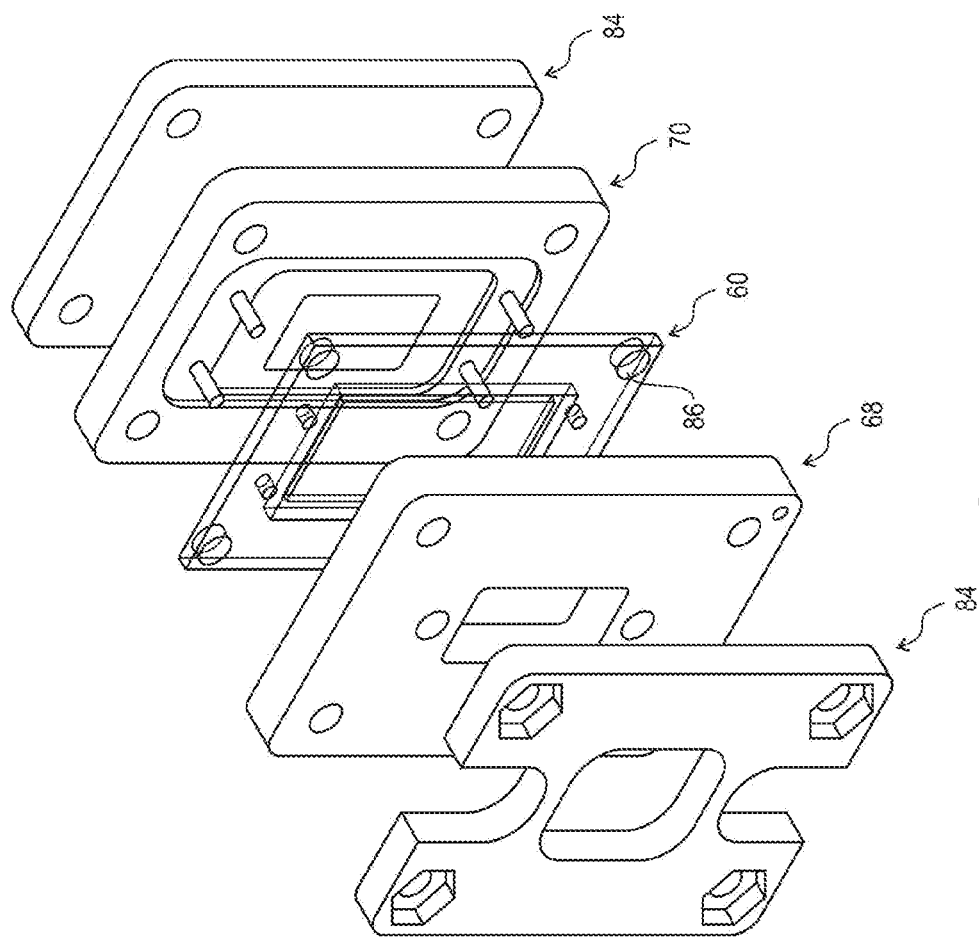
FIG. 9 is an exploded view of a membrane system monitoring cell, showing the cell sandwiched between clamps to secure the membrane system monitoring cell together.

The present invention is advantageous because commonly used surface monitoring cells utilize parallel light paths generated by reflecting lights originating from light sources that provided light in the perpendicular orientation with respect to the membrane surface such light needed to be directed at side mirrors positioned inside the retentate flow channel. In addition to potentially causing flow disturbance, the use of mirrors in other systems to guide light in the appropriate direction limit the attainable thickness of the retentate channel, that is, the thinner the retentate channel, the smaller are the mirrors that must be utilized. Such small mirrors are challenging to manufacture and embed into the retentate flow channel. In addition, as light is directed toward the mirrors with a light path in perpendicular orientation to the membrane surface, there is stray light which can reduce visibility and contrast of surface objects. The problem of stray light worsens when smaller mirrors are utilized. Because of the difficulty of using small mirrors, it is difficult to form thin retentate flow channels (e.g., thinner than 1 mm) that can accommodate feed spacers typically used in the spiral-wound membrane elements used in plants. While other systems have attempted to use an entirely transparent retentate module, it has been reported that these systems introduce significant stray light at a high angle or perpendicular orientation with respect to the membrane surface, thereby jeopardizing visibility and contrast of surface objects. To overcome these problems, the fully transparent retentate block requires cumbersome fine adjustments of the light source orientation to minimize stray light, prolonging setup time and making even surface-parallel illumination of the retentate channel challenging to achieve. The present invention is advantageous over systems that use fully transparent retentate block through the use of the previously described light guide 60. because instead of a fully transparent retentate block the present invention uses a thin light guide 60 clamped between an opaque retentate module support block 68 and opaque permeate module support block 72. The light guide 60 is sandwiched between the blocks 68, 72 using clamps 84 on opposing sides of the blocks, as shown in FIG. 9. The clamps 84 may be secured to each other via attachment members such as bolts, that span the clamps 84, retentate module support block 68, light guide 60, and permeate module support block 70. The attachment members or bolts secure the membrane cell 10. The clamps may be made of any material sufficient to hold the sandwiched elements together. Such materials include a number of metals, preferably aluminum or stainless steel. Bolts secure the components together by traversing apertures in one or more of the components, such as the edge lit light guide 72. Embodiments described and shown in the figures are one way in which the components can be arranged, but one can envision other arrangements without detracting from the spirit of the invention.

Cell Assembly

An example of the embodiment of the integrated membrane surface monitoring cell 10 is shown in FIG. 7a and FIG. 7b, showing a cross sectional exploded view of the MSM cell 10. In this configuration the three separate modules are integrated and form one complete unit. The MSM cell 10 is a unit that is built as a removable cassette 88 that can be easily removed and replaced without affecting the positioning of the illumination system 18 or surface illumination components 20. The cassette 88 can include any number of components, including the clamps 84 and all components of the MSM cell 10 sandwiched between the clamps 84.

Image and Spectral Analysis

Figure 8:
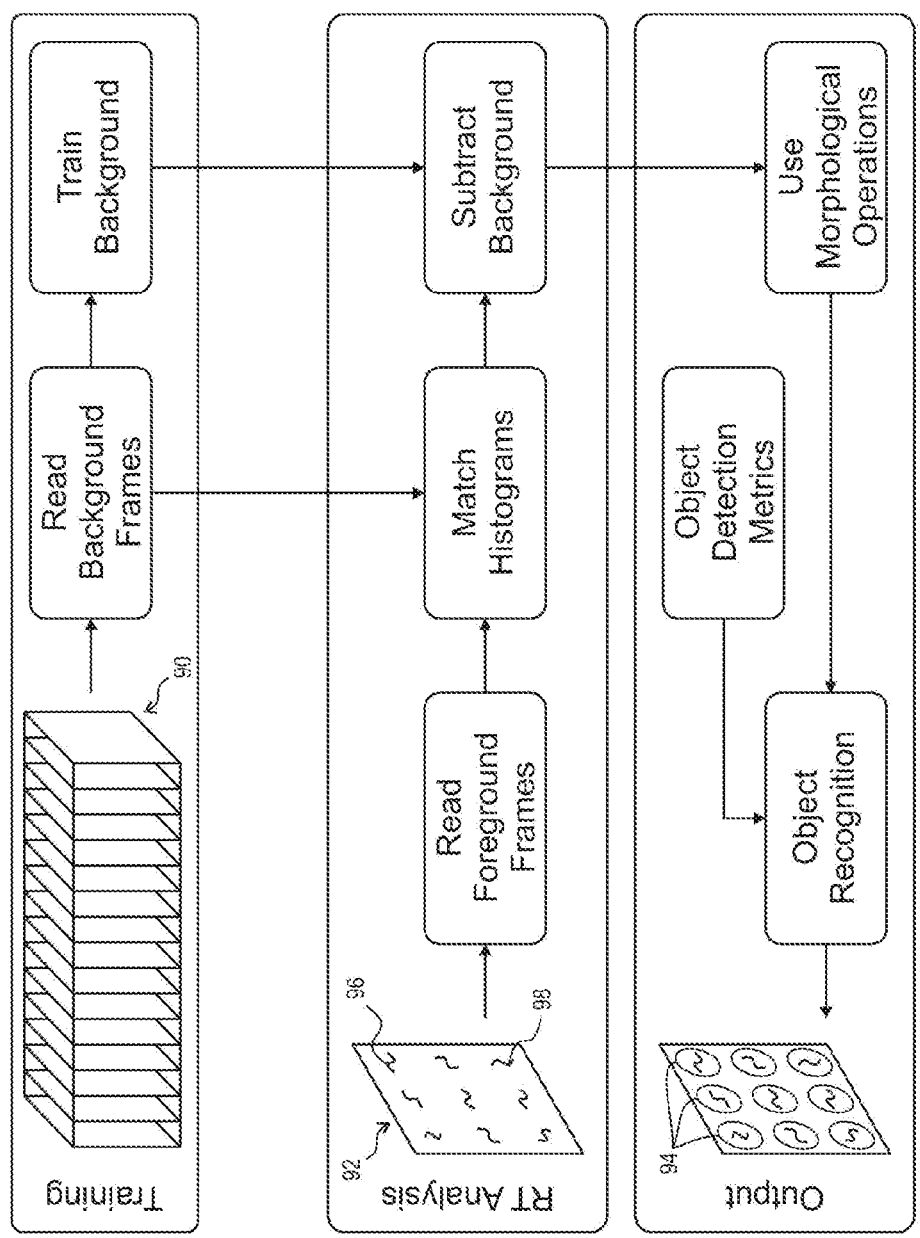
FIG. 8 is a block diagram illustrating the steps of image and spectral analysis of the membrane surface in an embodiment of the invention.

A surface vision module 44, which can be a video streaming and reflectance spectral data acquisition module is interfaced with the Membrane Monitoring system 26 to connect with a web-based visualization and storage platform for real time membrane surface analysis. The module 44 is controlled directly by its software component that acquires high quality data for object detection, recognition and quantification of various surface metrics using the advanced image and spectral analyses software. The image and spectral analyses software, which follows the workflow as described in FIG. 8 utilizes an array of computer vision algorithms and statistical methods to detect membrane surface scaling 96 and fouling 98 as a function of time based on various surface features/metrics. The features that are used to detect the existence and type of surface scaling include object size distribution, shapes, texture, intensity (at pixel level), regional gradients, and geometry (e.g., circularity, convexity, shape identification using corner detection). For scaling/fouling detection, the initial state of the (clean) membrane 90 is trained with previously captured data of known characteristics. A set of regional heuristics are trained in this module based on the intensities, local pixel neighborhood and gradients to estimate the statistical model of the background. The trained model then periodically segments the regions where fouling/scaling occurred using its learned heuristics to determine foreground masks 92 as detected changes. Detection is further refined using several morphological and normalization operations such as histogram equalization, image opening and dilation to remove unwanted noise and isolate loosely connected components 94 in the image. The streaming data acquisition and analysis modules are integrated with the hardware and other process control modules of the software.

In addition to automated detection of mineral scale 96 (e.g., as shown in FIG. 9) and various types of surface fouling 98 (e.g., particles, organics and biofoulants), a deep-learning engine is embedded for online image and spectral analyses using advanced pattern recognition techniques. The engine is trained using a large customized set of learnable filters and provides the capability to automatically produce annotations (labels for objects) along with their confidence scores (i.e., the probabilities the detected object belongs to a certain type/class of foulants/scalants. The capability of quantifying surface mineral scale/fouling as a function of time using advanced computer algorithms and storing object characteristics is accomplished using the auto-scaled time-series database system. The above characteristics are stored both in local and remote data acquisition and storage modules allowing real time analysis, automated trigger generation for reaching critical scaling/fouling thresholds, and dynamic system report generation. In conjunction with scale detection and deep learning modules, the advanced online platform supporting the above advanced features is implemented to enhance the experience with real-time monitoring of surface fouling/mineral scaling and automated recognition of their types, size, geometry and extent of surface coverage. Using the above information and system specifications from the dynamic reports, decision-support process can be used to identify critical actions to optimize process control and adjust membrane plant operating parameters.

The following reference numerals are used throughout FIGS. 1-9:

10 Membrane surface monitoring (MSM) cell
12 Controller
14 Inlet stream
16 Membrane
17 First surface of the membrane
18 Surface illumination components
19 Second surface of the membrane
20 Imaging components
22 Feed side of MSM cell
23 Retentate side of MSM cell
24 Membrane plant/unit 26 Membrane surface monitoring system
28 Plant control system
30 High pressure side stream
32 Pump
34 Drain
36 Concentrate/retentate conduit
38 Main valve of the membrane plant
40 Channel feed spacer
42 Retentate channel
44 Surface vision module
46 Retentate module
48 Permeate module
50 Edge illumination light source
52 Inlet conduit
54 Retentate outlet conduit
56 Permeate collection section
58 Permeate outlet conduit
60 Edge-lit light guide/retentate channel structure
61 Lateral edge of the edge-lit light guide
62 Light source
64 Transparent or optical window
66 Camera-lens unit
68 Retentate module support block
70 Permeate module support block
72 Light guide aperture
74 Tapered surface of the light guide
76 Seals
78 Light guide indent
80 Camera
82 Lens
84 Clamps
85 Objects on the membrane
86 Edge lit light guide aperture
88 Cassette
90 Background frames/clean membrane
92 Foreground frames/masks
94 Recognized object/loosely connected components
96 Scaling
98 Fouling
100 External data communications
106 Signal lines
108 Outlet conduit
FT-1 First flow meter/transmitter
FT-2 Second flow meter/transmitter
CV Control valve
PT-1 First pressure transmitter
CT-1 First conductivity meter/transmitter
CT-2 Second conductivity meter/transmitter
SP1 Sampling point 1
SP2 Sampling point 2
F Feed
P Permeate
C Concentrate stream While the invention has been described in terms of exemplary embodiments, it is to be understood that the words that have been used are words of description and not of limitation. As is understood by persons of ordinary skill in the art, a variety of modifications can be made without departing from the scope of the invention defined by the following claims, which should be given their fullest, fair scope.

What is claimed is:

1. A membrane surface monitoring cell for use in monitoring membrane scaling, particulate fouling, organics, and biofouling that receives a feed stream and discharges a concentrate stream, the membrane surface monitoring cell comprising:
   a) a visually-observable membrane, observable through an optical window of the membrane surface monitoring cell, the visually-observable membrane having a first surface on an active feed-side;
   b) an edge-lit light guide having an aperture forming a retentate channel operable to isolate pressurized fluid in the retentate channel, the visually-observable membrane positioned adjacent the edge-lit light guide and overlaying the aperture, wherein the edge-lit light guide is composed of a transparent or translucent material to illuminate the first surface of the visually-observable membrane, thereby allowing an observer to view scaling, particulates, and biofouling on the first surface of the visually-observable membrane; and,
   c) an edge illumination light source affixed to the edge-lit light guide, the edge illumination light source operable to illuminate the edge-lit light guide, thereby providing illumination substantially parallel to the visually-observable membrane.

2. The membrane surface monitoring cell of claim 1, wherein the visually-observable membrane has a second surface opposing the first surface, the second surface forming a permeate side opposing an active feed side, the membrane surface monitoring cell further comprising:
   a) a permeate collection section adjacent the second surface of the visually-observable membrane, and
   b) a feed spacer between the aperture of the edge-lit light guide, the feed spacer sized to accommodate a predetermined size of the retentate channel.

3. The membrane surface monitoring cell of claim 1, wherein the edge-lit light guide has a tapered surface along the retentate channel, thereby minimizing flow disturbance.

4. The membrane surface monitoring cell of claim 1, wherein the edge illumination light source is configured to direct light along a direction substantially parallel to the first surface of the visually-observable membrane.

5. The membrane surface monitoring cell of claim 1, wherein the edge illumination light source is affixed along a lateral edge of the edge-lit light guide, thereby isolating an imaging system.

6. A membrane surface monitoring system for monitoring membrane scaling, particulate fouling, organics and biofouling in a filtration unit having a membrane, wherein the filtration unit receives a feed stream and discharges a concentrate stream, the membrane surface monitoring system comprising:
   a) a membrane surface monitoring cell having:
      (i) a visually-observable membrane having a first surface on an active feed-side;
      (ii) an edge-lit light guide having an aperture forming a retentate channel operable to isolate pressurized fluid in the retentate channel, the visually-observable membrane positioned adjacent the edge-lit light guide and overlaying the aperture, wherein the edge-lit light guide is composed of a transparent or translucent material to illuminate the first surface of the visually-observable membrane, thereby allowing an observer to view scaling, particulates, and biofouling on the first surface of the visually-observable membrane;
      (iii) an edge illumination light source affixed to the edge-lit light guide, the edge illumination light source operable to illuminate the edge-lit light guide, thereby providing illumination substantially parallel to the visually-observable membrane;
   b) an imaging system connected to the membrane surface monitoring system, the imaging system for:

(i) capturing at least one of an image and a reflectance spectra of a surface of the visually-observable membrane, and (ii) creating at least one of an image data signal and a spectral imaging data signal indicative of the captured at least one of the image and the reflectance spectra;

c) a data processing system connected to the imaging system so as to receive the image data signal therefrom, wherein the data processing system is capable of analyzing the image data signal so as to provide an indication of an extent of at least one of scaling, particulate fouling and biofouling, on the visually-observable membrane; and, d) a controller to control illumination, at least one of image capturing and spectra capturing, image data management, image analysis, and external data communication, inlet flow rate, and pressure on an active-feed to be approximately that of a membrane plant element or a plant segment being monitored.

7. The system of claim 6, further comprising:

a) a retentate flow meter fitted at a retentate stream exiting from the membrane surface monitoring cell; and, b) a retentate flow control valve fitted at the retentate stream exiting from the membrane surface monitoring cell, wherein the controller provides feed-back control input to manipulate a control valve actuator to adjust an inflow rate to the retentate channel to match a crossflow velocity in the retentate channel of the membrane plant element or the plant segment being monitored.

8. The system of claim 7, wherein the membrane surface monitoring cell is characterized as a removable cassette, whereby the removable cassette can be inserted and removed from the membrane surface monitoring system without having to alter a position of the imaging system.

9. The system of claim 6, comprising an imaging camera employing a charged coupled device (CCD) image sensor or a Complementary Metal Oxide Semiconductor (CMOS) image sensor that is positioned above a retentate module and where a lens of the CCD or the CMOS image sensor is positioned above an optical window, the CCD or the CMOS image sensor to capture data from the visibly-observable membrane;

whereby the membrane surface monitoring system is capable of providing at least one of real-time surface images and real-time imaging spectra of the visually-observable membrane to provide a range of quantitative metrics, including at least one of evolution of membrane surface area coverage by scale, foulants, identification of a class of foulants and identification of a class of scalants, and establishing differences in fouling and scalants membrane surface area coverage over an operation period of the membrane plant, and whereby quantitative output of digital or analog signals relating to the fouling or mineral metrics can be used to guide a plant operator in establishing appropriate strategies for mitigating membrane fouling and scaling.

10. The membrane monitoring system of claim 9, a) wherein the image data captured is analyzed via the data processing system to determine a percent and number density of domains of surface area of the visually-observable membrane of at least one of (i) scale, (ii) foulants, and (iii) deposited particles, and b) wherein a type of mineral scalants and a type of foulants on the surface of the visually-observable membrane are identified based on at least one of (i) geometric size and shape analysis relative to those established for known scalants and foulants, and (ii) spectral analysis of images captured by the imaging system, through the use of spectral analysis and pattern recognition relative to such data metrics established for known scalants and foulants.

11. A method for monitoring membrane scaling and fouling, the method comprising:

a) providing a membrane surface monitoring cell having:
    i) a visually-observable membrane having a first surface on an active feed-side, the visually-observable membrane observable through an optical window of the membrane surface monitoring cell;

b) passing an intake stream across the first surface of the visually-observable membrane;

c) collecting visual data from an illuminated portion of the first surface of the visually-observable membrane, wherein the collected data indicate presence and degree of scaling and fouling on the first surface of the visually-observable membrane;

d) conveying the collected visual data to a data processing system; and, e) interpreting the collected visual data with the data processing system to determine an extent of scaling and fouling on the visually-observable membrane and membrane of a filtration unit.

12. The method of claim 11, further comprising the step of controlling the filtration unit in response to the extent of scaling or fouling on the visually-observable membrane.

13. The method of claim 11, wherein the step of interpreting the collected visual data includes at least one of displaying a real-time image of the surface of the visually-observable membrane and surface imaging spectra; and, correlating the collected visual data to a scaling or fouling condition of the membrane of the filtration unit.

* * * * *